US008305981B2

(12) United States Patent
Youn et al.

(10) Patent No.: US 8,305,981 B2
(45) Date of Patent: Nov. 6, 2012

(54) BAND ADAPTIVE MODULATION AND CODING METHOD SHARING RESOURCES WITH NEIGHBOURING BASE STATIONS AND MOBILE STATION SUPPORTING THE SAME

(75) Inventors: Ae Ran Youn, Gyeonggi-do (KR); Bin Chul Ihm, Gyeonggi-do (KR); Yong Ho Kim, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 318 days.

(21) Appl. No.: 12/599,475

(22) PCT Filed: May 6, 2008

(86) PCT No.: PCT/KR2008/002532
§ 371 (c)(1),
(2), (4) Date: Nov. 9, 2009

(87) PCT Pub. No.: WO2008/140202
PCT Pub. Date: Nov. 20, 2008

(65) Prior Publication Data
US 2010/0254323 A1    Oct. 7, 2010

(30) Foreign Application Priority Data
May 10, 2007    (KR) .......................... 10-2007-0045588

(51) Int. Cl.
*H04W 4/00*    (2009.01)
(52) U.S. Cl. ....................................... 370/329; 370/341
(58) Field of Classification Search .................... 370/329
See application file for complete search history.

(56) References Cited

U.S. PATENT DOCUMENTS

| 7,933,195 | B2 * | 4/2011 | Kim et al. | 370/204 |
|---|---|---|---|---|
| 2005/0101326 | A1 * | 5/2005 | Kang et al. | 455/436 |
| 2005/0197126 | A1 * | 9/2005 | Kang et al. | 455/442 |
| 2005/0201327 | A1 | 9/2005 | Kim et al. | |
| 2005/0282547 | A1 * | 12/2005 | Kim et al. | 455/436 |
| 2006/0003767 | A1 * | 1/2006 | Kim et al. | 455/436 |
| 2006/0009228 | A1 * | 1/2006 | Kang et al. | 455/450 |
| 2006/0094436 | A1 * | 5/2006 | Kim et al. | 455/450 |
| 2006/0146856 | A1 * | 7/2006 | Jung et al. | 370/431 |
| 2007/0274253 | A1 * | 11/2007 | Zhang et al. | 370/328 |
| 2009/0086683 | A1 * | 4/2009 | Pendergrass et al. | 370/335 |
| 2010/0215012 | A1 * | 8/2010 | Cho et al. | 370/329 |
| 2010/0254323 | A1 * | 10/2010 | Youn et al. | 370/329 |

FOREIGN PATENT DOCUMENTS
WO    2006059827    6/2006

* cited by examiner

*Primary Examiner* — Derrick Ferris
*Assistant Examiner* — Gerald Smarth
(74) *Attorney, Agent, or Firm* — Lee, Hong, Degerman, Kang & Waimey

(57) ABSTRACT

A band adaptive modulation and coding method sharing resources with neighboring base stations and a mobile station supporting the same are disclosed. The mobile station identifies a channel status for each band by periodically scanning a neighboring base station, and requests a service base station to convert a current mode to a band sharing AMC mode if the identified channel stats satisfies a predetermined condition. The mobile station can use CQICH of 4 bits or 6 bits to request mode conversion. Selectively, the service base station can request the mobile station of channel status information of a neighboring base station to determine mode conversion.

8 Claims, 5 Drawing Sheets

BAND ADAPTIVE MODULATION AND CODING METHOD SHARING RESOURCES WITH NEIGHBOURING BASE STATIONS AND MOBILE STATION SUPPORTING THE SAME

CROSS-REFERENCE TO RELATED APPLICATIONS

This application is a national stage application of International Application No. PCT/KR2008/002532, filed on May 6, 2008, which claims the benefit of earlier filing date and right of priority to Korean Application No. 10-2007-0045588, filed on May 10, 2007.

TECHNICAL FIELD

The present invention relates to a band adaptive modulation and coding method sharing resources with neighboring base stations and a mobile station supporting the same.

BACKGROUND ART

Hereinafter, the general technology corresponding to a background of a technical spirit used in the present invention will be described in brief.

In Mobile Internet based on IEEE 802.16, a mobile station is operated in a diversity sub-channel mode that is a general wireless state, and then is operated in a band adaptive modulation & coding (band AMC) mode if a previously set condition is satisfied. The band AMC mode represents an operation mode that the mobile station collects channel quality information (CQI) of a sub-channel which is currently in service and performs data transmission by using a band comprised of a predetermined number of sub-channels which are in excellent state, based on the collected channel quality information.

Therefore, the mobile station collects channel quality information of each sub-channel, which is currently in service, by measuring CQI of a base station while being operated in a diversity mode by default. Also, the mobile station selects four to five best sub-channels among the sub-channels and requests the base station to convert the current mode to the band AMC mode. Then, the base station determines whether to accept the above request in accordance with a policy which is previously set, such as a resource management rule, and accepts conversion to the band AMC mode by transmitting a predetermined acknowledgement (Ack) message to the mobile station.

If a carrier to interference and noise ratio (CINR) is used as the channel quality information, the mobile station reports the CINR of the four to five best bands to the base station, and the base station allocates a band AMC sub-channel to the reported best bands. Afterwards, the mobile station still collects channel quality information of each sub-channel periodically and can report only a difference value from channel quality information of the best bands to the base station.

According to the aforementioned band AMC mode, since bands comprised of better sub-channels than those of an existing diversity mode are used, they are robust to noise and interference of neighboring cells. Also, it is advantageous in that a transmission rate is improved as a coding rate is enhanced.

Meanwhile, the existing band AMC mode has a limitation in that it is performed with respect to only sub-channels of a service base station. However, if the mobile station is located near the boundary of cells, it can receive a signal from a neighboring base station. In this case, if the mobile station shares a frequency band of a sub-channel for the band AMC mode with the neighboring base station, a range for selecting the best band becomes widen. If the same data are received through a sharing channel, they are combined with each other to enhance reliability in transmission. If different data are transmitted and received through the sharing channel, it is advantageous in that transmission efficiency can be enhanced. However, a problem occurs in that a proper procedure of sharing resources with neighboring base stations in a band AMC mode is not disclosed in the current IEEE 802.16 standard.

DETAILED DESCRIPTION OF THE INVENTION

Technical Problems

Accordingly, the present invention is directed to a band adaptive modulation and coding method sharing resources with neighboring base stations and a mobile station supporting the same, which substantially obviate one or more problems due to limitations and disadvantages of the related art.

An object of the present invention is to provide a band adaptive modulation and coding method sharing resources with neighboring base stations and a mobile station supporting the same, in which a channel quality information report mechanism is provided so that a mobile station in a band AMC mode shares bands with neighboring cells.

Technical Solutions

To achieve the object and other advantages and in accordance with the purpose of the invention, as embodied and broadly described herein, a band AMC method performed by a mobile station in a broadband wireless access system, which shares resources with neighboring base stations comprises identifying a channel status for each band by periodically scanning a neighboring base station, and converting a current mode to a band sharing AMC mode if the identified channel stats satisfies a predetermined condition.

In this case, converting a current mode to a band sharing AMC mode includes requesting a service base station of conversion to the band sharing AMC mode if a maximum value of standard deviation of values of the identified channel status for each band is smaller than a band allocation threshold value.

At this time, requesting conversion to a band sharing AMC mode is performed through CQICH. In more detail, requesting conversion to a band sharing AMC mode is performed using one specific bit of effective CINR, enhanced fast-feedback channel subcarrier modulation, and band sharing fast-feedback channel subcarrier modulation.

Furthermore, the band AMC method further comprises requesting the mobile station of the identified channel status for each band through the service base station. In this case, requesting the identified channel status is performed through NBR-REP-REQ message.

Furthermore, converting a current mode to a band sharing AMC mode includes requesting the service base station of conversion to a band sharing AMC mode through the NBR-REP-RSP message if a maximum value of standard deviation of values of the identified channel status for each band is smaller than a band allocation threshold value.

Furthermore, converting a current mode to a band sharing AMC mode includes comparing the maximum value of standard deviation of values of the identified channel status for each band with the band allocation threshold value through the service base station, and requesting the mobile station of conversion to the band sharing AMC mode if the maximum value of standard deviation is smaller than the band allocation threshold value.

In another aspect of the present invention, a mobile station supporting a band AMC mode, which performs the band AMC mode in a broadband wireless access system, comprises a control module identifying a channel status for each band by periodically scanning a neighboring base station, and converting a current mode to a band sharing AMC mode if the identified channel stats satisfies a predetermined condition.

The control module requests a service base station of conversion to the band sharing AMC mode if a maximum value of standard deviation of values of the identified channel status for each band is smaller than a band allocation threshold value.

Advantageous Effects

According to the present invention, since the mobile station can share a frequency band of a sub-channel for a band AMC mode with neighboring base stations, a range for selecting the best band becomes widen. Also, if the same data are received through a sharing channel, they are combined with each other to enhance reliability in transmission. Moreover, if different data are transmitted and received through the sharing channel, transmission efficiency can be enhanced.

BEST MODE FOR CARRYING OUT THE INVENTION

Hereinafter, structures, operations, and other features of the present invention will be understood readily by the preferred embodiments of the present invention, examples of which are illustrated in the accompanying drawings.

The technology, which will be described later, can be used for various communication systems. The communication system is widely deployed to provide various communication services such as voice and packet data.

In the embodiment of the present invention, a base station generally means a fixed station which communicates with a mobile station, and may be referred to as other terminologies such as node-B, base transceiver system (BTS), and access point. The mobile station may be fixed or have mobility, and may be referred to as other terminologies such as user equipment (UE), user terminal (UT), subscriber station (SS), and wireless device.

One embodiment of the present invention suggests a band sharing AMC mode for performing a band AMC mode by sharing band resources of neighboring base stations in addition to band resources of a service base station. In other words, unlike an existing band AMC mode which selects the best bands based on a service base station only, the band sharing AMC mode selects a first best band based on the service base station and selects a second best band (or best band equivalent to the number of neighboring base stations) with respect to neighboring base stations. Accordingly, if the mobile station receives the same data from a plurality of base stations, reliability in data transmission can be obtained. Also, if the mobile station transmits and receives different data to and from a plurality of base stations, transmission speed of the data can be improved.

A configuration of a channel band used in the aforementioned band sharing AMC mode will be described below.

Figure 1:
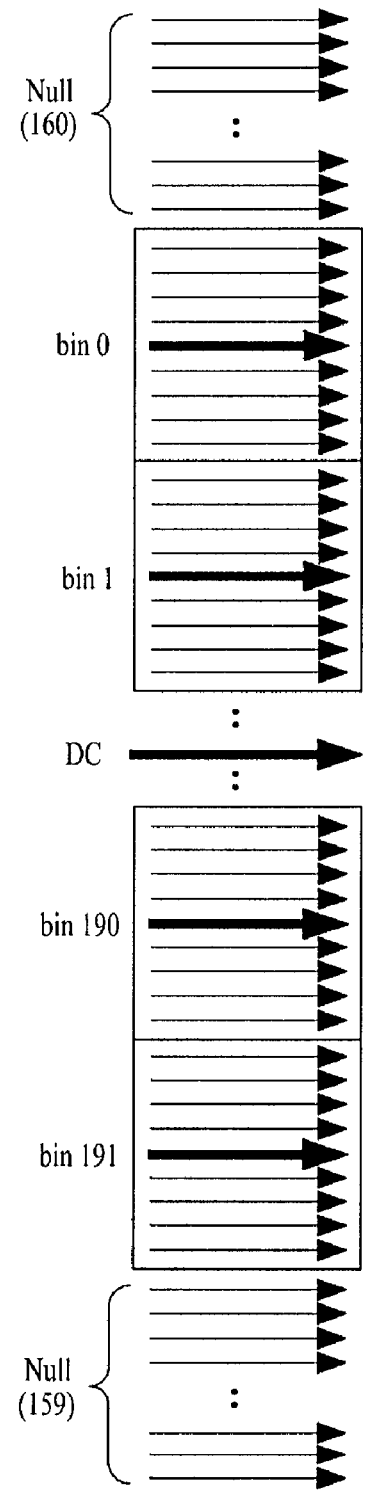
FIG. 1 and FIG. 2 are diagrams illustrating examples of configurations of a channel band in a band AMC mode or a band sharing AMC mode.
Figure 2:
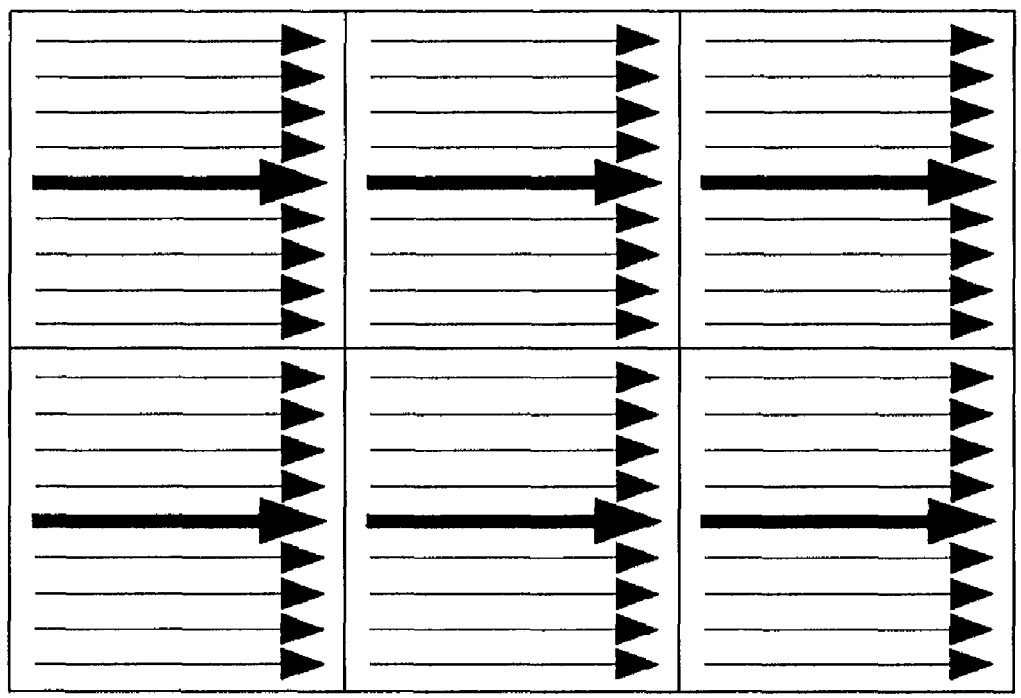

FIG. 1 and FIG. 2 illustrate examples of configurations of a channel band in the band AMC mode or the band sharing AMC mode. In this case, it is assumed that the band AMC mode is applied to a communication system which uses a plurality of sub-carriers, such as an orthogonal frequency division multiplexing (OFDM) mode.

As illustrated in FIG. 1, null zones exist in both corners of an OFDM channel to avoid interference between channels, and bins and DC carriers, which are comprised of a predetermined number of sub-carriers, exist between the null zones. One bin includes eight data sub-carriers and one pilot, and four bins constitute one band.

Since one channel includes 192 bins in the example of FIG. 1, a total of 18 bands exist. In the band AMC mode, since different modulation & coding set (MCS) levels can be set with respect to each band, efficient data transmission can be performed. Also, as illustrated in FIG. 2, in a broadband wireless access system, a sub-channel has a matrix type of 2*3.

Hereinafter, a procedure of performing a band AMC by sharing specific band resources with neighboring base stations based on the aforementioned band configuration will be described in detail.

Figure 3:
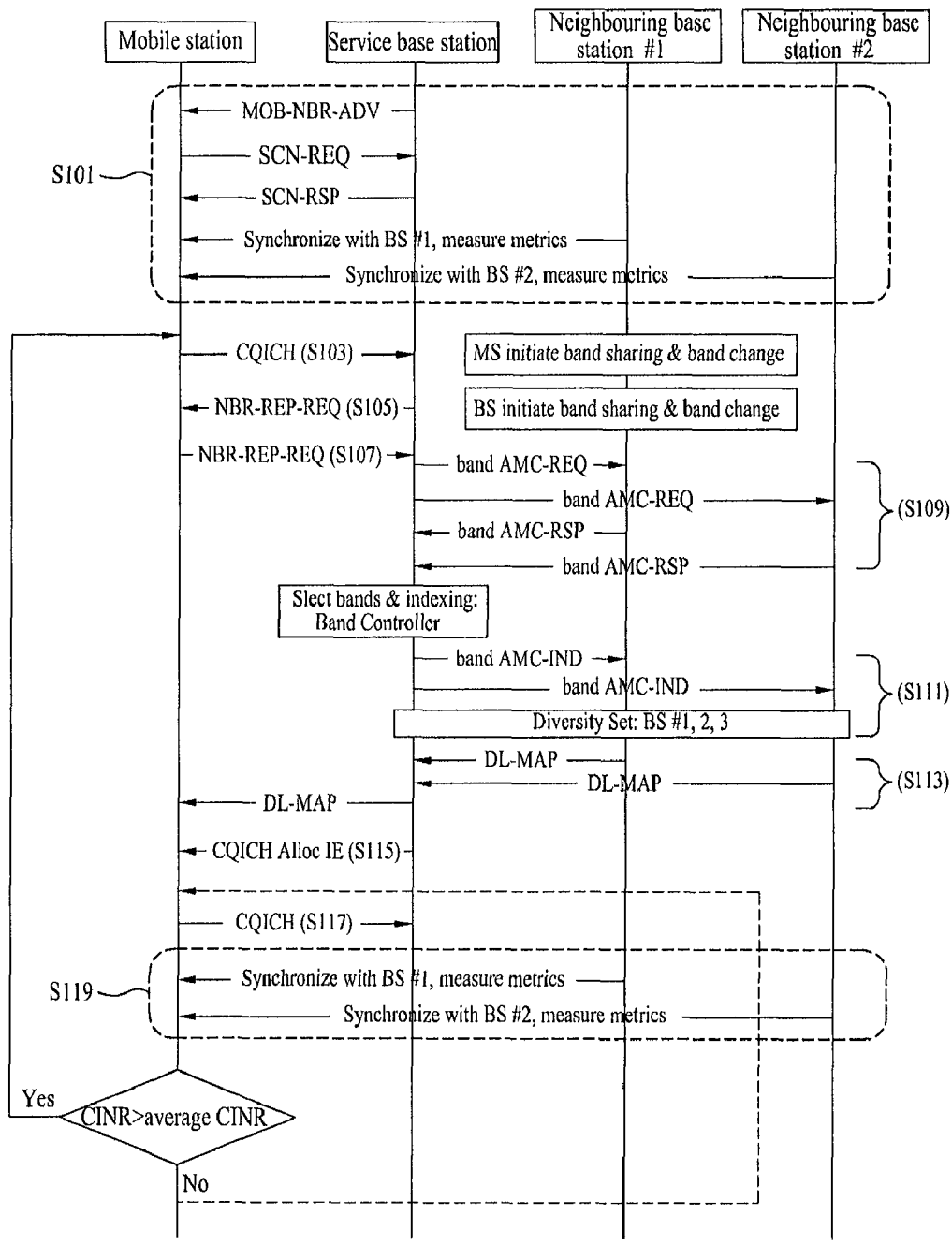
FIG. 3 is a signal flow chart sequentially illustrating an operation procedure of a band AMC mode which shares bands with neighboring base stations in a broadband wireless access system.

FIG. 3 is a signal flow chart sequentially illustrating an operation procedure of a band AMC mode which shares bands with neighboring base stations in a broadband wireless access system.

The mobile station periodically receives information of neighboring cells from the service base station, and requests scanning with the neighboring base stations based on the received information of the neighboring cells to identify the channel status for each band of the neighboring base stations (S101). At this time, the mobile station can receive index information (for example, N-Neighbour BS=2) of a specific neighboring base station from the service base station through MOB-NBR-ADV message, and can perform scanning of a corresponding neighboring base station by transmitting SCN-REQ message to the service base station and receiving SCN-RSP message from the service base station, wherein the SCN-REQ message includes predetermined scan parameters (for example, start frame=M, duration=N), and the SCN-RSP message reports grant of the SCN-REQ message. In this case, the CINR could be channel quality information identified through scanning of the neighboring base station. An example of the MOB-NBR-ADV message is as follows.

TABLE 1

| Syntax | Size | Notes |
| --- | --- | --- |
| MOB_NBR-ADV_Message_format( ) { | — | — |
| Management Message Type = 53 | 8 bits | — |
| Skip-optional-fields bitmap | 8 bits | Bit [0]: if set to 1, omit Operator ID field. Bit [1]: if set to 1, omit NBR BS ID field. Bit [2]: if set to 1, omit HO process optimization field. Bit [3]: if set to 1, omit QoS related fields. Bit [4]-[7]: Reserved. |
| If (Skip-optional-fields-[0]=0) { | — | — |
| Operator ID | 24 bits | Unique ID assigned to the operator. Identifier of the network provider |
| } | — | — |
| Configuration Change Count | 8 bits | Incremented each time the information for the associated neighbor BS has changed. |
| Fragmentation Index | 4 bits | Indicates the current fragmentation index. |
| Total Fragmentation | 4 bits | Indicates the total number of fragmentations. |
| N_NEIGHBORS | 8 bits | — |
| For (j=0 ; j<N_NEIGHBORS ; j++) { | — | — |
| Length | 8 bits | Length of message information within the iteration of N_NEIGHBOR in bytes including all fields within the FOR loop. |
| PHY Profile ID | 8 bits | Aggregated IDs of Co-located FA Indicator, FA Configuration Indicator, FFT size, Bandwidth, Operation Mode of the starting subchannelization of a frame, and Channel Number. |
| if (FA Index Indicator == 1) { | — | — |
| FA Index | 8 bits | This field, Frequency Assignment Index, is present only the FA Index Indicator in PHY Profile ID is set. Otherwise, the neighbor BS has the same FA Index or the center frequency is indicated using the TLV encoded information. |
| } | — | — |
| if (BS EIRP Indicator == 1) { | — | — |
| BS EIRP | 8 bits | Signed Integer from −128 to 127 in unit of dBm This field is present only if the BS EIRP indicator is set in PHY Profile ID. Otherwise, the BS has the same EIRP as the serving BS. |
| } | — | — |
| if (Skip-optional-fields[1]=0) { | — | — |
| Neighbor BSID | 24 bits | This is an optional field for OFDMA PHY and it is omitted or skipped if Skip optional fields Flag = 1. |
| Neighbor BS Bitmap index | 8 bits | Neighbor BS indicating bitmap |
| } | — | — |

TABLE 1-continued

| Syntax | Size | Notes |
|---|---|---|
| Preamble Index/Subchannel Index | 8 bits | For the SCa and OFDMA PHY this parameter defines the PHY specific preamble. For the OFDM PHY, the 5 LSB contain the active DL subchannel index and the. The 3MSB shall be Reservedand set to '0b000' For OFDMA PHY, bit 7 is used to indicate the resue factor of the neighbor for purpose of CINR measurement for handoff. A value of '0' indicates a reuse fac- tor of 1 and a value of '1' indicates reuse factor of 3. |
| if (Skip-optional- fields[2]=0) { | — | — |

In Table 1, Neighbour BS Bitmap index represents index information of a specific neighboring base station to be requested to the service base station.

Subsequently, the service base station allocates uplink resources to the mobile station, so that the mobile station can transmit downlink channel quality information (DL CQI) of each base station to the service base station. The mobile station periodically transmits the corresponding information to the base station through the allocated resources. At this time, the CINR identified through the scanning could be used as the DL CQI.

If a scan result value of the neighboring base station satisfies a predetermined condition, the mobile station requests to the service base station of conversion to the band sharing AMC mode (S103). An example of the condition for the mode conversion includes a case where a maximum value of standard deviation of CINR for each band, which is measured from the service base station and adjacent cells, is smaller than a band allocation threshold value.

Meanwhile, the mobile station can transmit a predetermined bit value to CQICH to request conversion to the band sharing AMC mode. In this case, the request for the mode conversion can be performed in various manners depending on the size of the bit value.

As a first example, if CINR is transmitted at 4 bits through the CQICH, the mobile station can request mode conversion by using a reserved MCS level or reserved bit of effective CINR. An example of an encoding result of the effective CINR is as follows.

TABLE 2

| Label | Encoding | MCS |
|---|---|---|
| 0 | 0b0000 | QPSK ½, repetition 6 |
| 1 | 0b0001 | QPSK ½, repetition 4 |
| 2 | 0b0010 | QPSK ½, repetition 2 |
| 3 | 0b0011 | QPSK ½ |
| 4 | 0b0100 | QPSK ¾ |
| 5 | 0b0101 | 16-QAM ½ |
| 6 | 0b0110 | 16-QAM ¾ |
| 7 | 0b0111 | 64-QAM ½ |
| 8 | 0b1000 | 64-QAM ⅔ |
| 9 | 0b1001 | 64-QAM ¾ |
| 10 | 0b1010 | 64-QAM ⅚ |
| 11 | 0b1011 | A decrease in CQICH duration is recommended (effective CINR has not changed from previous CQICH slot). This encoding shall not be repeated over consecutive CQI slots. |

TABLE 2-continued

| Label | Encoding | MCS |
|---|---|---|
| 12 | 0b1100 | Normal, band → band sharing |
| 13 | 0b1101 | Band sharing → band sharing |
| 14 | 0b1110 | Band sharing → normal or band |
| 15 | 0b1111 | Reserved |

Although MCS levels 12 to 15 remain reserved in the conventional effective CINR, this embodiment suggests that MCS levels 12 to 14 are allocated for conversion of the band AMC mode as illustrated in Table 2. In other words, 1) in level 12, the mobile station requests conversion from a normal mode or a band AMC mode to the band sharing AMC mode, 2) in level 13, the mobile station requests conversion from a first band sharing AMC mode to a second band sharing AMC mode, and 3) in level 14, the mobile station requests inverse conversion of level 12. This will now be described in more detail.

1) Normal Mode or Band AMC Mode=>Sharing Band AMC Mode

A non-band AMC mode including a PUSC mode in default or the conventional band AMC mode is converted to the band sharing AMC mode suggested in the present invention. In this case, 4-bit CINR for request of mode conversion can be set to 0b1100.

2) Sharing Band AMC Mode=>Sharing Band AMC Mode

This case can be divided into two types. First, the mobile station which is performing the band AMC mode by using band resources of a specific neighboring base station performs the band AMC mode by changing the best band only because other band resources of the corresponding neighboring base station are in better condition. Second, if CINR of a specific band of a second neighboring base station (BS #2) is greater than an average value of best band CINR of a first neighboring base station (BS #1) which is performing the band AMC mode, the mobile station performs the band AMC mode through the band resources of the second neighboring base station by changing the base station. In both cases, 4-bit CINR for request of mode conversion can be set to 0b1101.

3) Sharing Band AMC Mode=>Normal Mode or Band AMC Mode

This is inverse mode conversion of the aforementioned case 1). In this case, 4-bit CINR for request of mode conversion can be set to 0b1110.

For another example, if CINR is transmitted at 6 bits through the CQICH, the mobile station can request mode conversion by using a reserved bit of enhanced fast-feedback channel subcarrier modulation according to the related art or a previously set bit of a band sharing fast-feedback channel subcarrier modulation. Hereinafter, the case where the mobile station requests mode conversion by using the previously set bit (for example, 3 bits) will be described. However, it is to be understood that the mode conversion, which will be described later, can equally be applied to the case where the mobile station uses the reserved bit.

Figure 4:
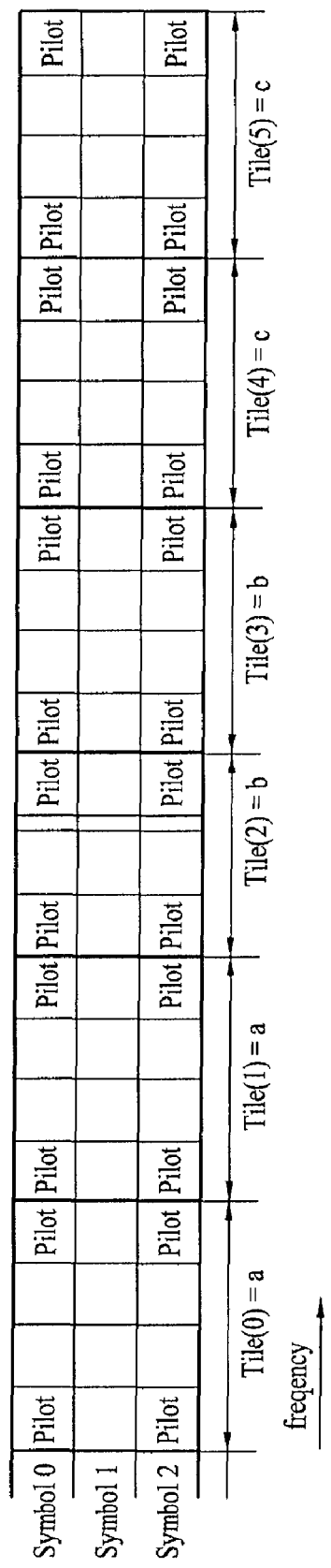
FIG. 4 is a diagram illustrating a structure of a sub-carrier mapped with CQICH when a mobile station requests a base station of mode conversion.

FIG. 4 is a diagram illustrating a structure of a sub-carrier mapped with the CQICH when the mobile station requests the base station of mode conversion.

It is assumed that the mobile station which is currently operated in a normal mode (or diversity mode) transmits '000' bit to the CQICH to request the service base station of conversion to the band sharing AMC mode. At this time, the CQICH allocated to each mobile station includes six Tiles, each of which represents vector index in pair.

Therefore, in FIG. 4, Tile(0) and Tile(1) mean the 0th bit, Tile(2) and Tile(3) mean the first bit, and Tile(4) and Tile(5) mean the second bit. Orthogonal modulation index mapped with each vector index has the same value as that of the related art. For example, when vector index=0, values mapped with Mn, 8m~Mn, 8m+7 are P0, P1, P2, P3, P0, P1, P2, P3, wherein P0=exp(j·π/4), P1=exp(j·3π/4), P2=exp(−j·3π/4), P3=exp(−j·π/4).

An example of an encoding result of band sharing fast-feedback channel subcarrier modulation used when the mobile station requests the base station of mode conversion through the aforementioned subcarrier mapping will be described as follows.

TABLE 3

| 3 bit-payload (binary) | Fast feedback vector indices per Tile Tile(0) = Tile(1), Tile(2) = Tile(3), Tile(4) = Tile(5) | Description |
| --- | --- | --- |
| 000 | 0, 1, 2 | normal → band sharing |
| 001 | 1, 2, 3 | Band → band sharing |
| 010 | 2, 3, 4 | band sharing → band sharing |
| 011 | 3, 4, 5 | Band sharing → band |
| 100 | 4, 5, 6 | Band sharing → normal |
| 101 | 5, 6, 7 | Reserved |
| 110 | 6, 7, 0 | Reserved |
| 111 | 7, 0, 1 | Reserved |

In Table 3, mode conversion requested by '000'~'100' of 3-bit payload has already been described in the description of the MCS levels 12~15 in the effective CINR of Table 2 above.

Although the mobile station requests the base station of mode conversion by using the CQICH in step S103, the service base station may selectively request the mobile station of channel quality information for each band of the neighboring base station by transmitting NBR-REP-REQ message to the mobile station by the request of the neighboring base station (S105). In such case, an example of the NBR-REP-REQ message is as follows.

TABLE 4

| Name | Type | Length | Value |
| --- | --- | --- | --- |
| Report type | 1.1 | 1 | Bit #0 = 1 Include DFS Basic report<br>Bit #1 = 1 Include CINR report<br>Bit #2 = 1 Include RSSI report<br>Bit #3-#6 in multiples of 1/32 (range [1/32, 16/32])<br>Bit #7 = 1 Include current transmit power report α avg |
| Channel number | 1.2 | 1 | Physical channel number (see 8.5.1) to be reported on. (license-exempt bands only) |
| Channel Type request(case I) | 1.3 | 1 | Bits #0-1: Type of request channel<br>00 = Normal subchannel,<br>01 = band AMC Channel,<br>10 = Safety Channel,<br>11 = Sounding<br>Bits #2-4: Type of band sharing<br>000 = reserved, shall be set to zero<br>001 = normal subchannel->band sharing<br>010 = band->band sharing<br>011 = band sharing->band sharing: request another band in band sharing mode<br>100 = band sharing->band<br>101 = band sharing->normal subchannel<br>110 = reserved, shall be set to zero<br>111 = reserved, shall be set to zero<br>Bits #5-7: reserved, shall be set to zero |
| Channel Type request(case II) | 1.3 | 1 | 000 = normal subchannel<br>001 = band AMC channel<br>010 = safety channel<br>011 = sounding<br>100 = band sharing<br>101-111 = reserved |
| Zone-specific physical CINR request | 1.4 | 3 | Bits #0-2: Type of zone on which CINR is to be reported 0b000: PUSC zone with 'use all SC = 0' 0b001: PUSC zone with 'use all SC = 1'/PUSC AAS zone 0b010: FUSC zone 0b011: Optional FUSC zone 0b100: Safety Channel region 0b101: AMC zone (only applicable to AAS mode) for DL AAS zone or AMC Zone with dedicated pilots) 0b110-0b111: Reserved |

TABLE 4-continued

| Name | Type | Length | Value |
|------|------|--------|-------|
| | | | Bit #3: 1 if zone for which CINR should be estimated is STC zone, 0 otherwise.
Bit #4: 1 if zone for which CINR should be estimated is AAS zone or zone with dedicated pilots, 0 other-wise.
Bits #5-6: PRBS_ID of the zone for which CINR should be estimated. Ignored for Safety Channel.
Bit #7: Data/pilot-based CINR measurement: 0 - Report the CINR estimate from pilot subcarriers, 1 - Report the CINR estimate from data subcarriers
Bits #8-13: Reported CINR shall only be estimated for the subchannels of PUSC major groups for which the corresponding bit is set. Bit #(k + 7) refers to major group k. Only applicable for CINR measurement on a PUSC zone
Bits #14-17: in multiples of 1/16 (range is [1/16, 16/16])
Bit #18: 0 - report only mean of CINR 1 - report both mean and standard deviation of CINR
Bits #19-23: Reserved, shall be set to zero |
| α avg | | | |

In Table 4, if the mobile station requests the base station of mode conversion by using the CQICH in the same manner as step S103 (Case I), the service base station identifies a type of a mode conversion target channel (for example, band AMC channel) and a type of mode conversion for the mobile station through Channel Type request (Case I) of the NBR-REP-REQ message (initiate band sharing mode), and converts the current mode to the requested mode (band change).

Meanwhile, when the service base station requests the mobile station of channel quality information for each band of the neighboring base station in the same manner as step S105 (Case II), the service base station requests the mobile station of channel quality information of the neighboring base station for mode conversion and mode conversion target channel (for example, band AMC channel) through Channel Type request (Case II) of the NBR-REP-REQ message, and converts the current mode to a specific mode with reference to information included in the NBR-REP-RSP message if the NBR-REP-RSP message is received from the mobile station.

In other words, the mobile station can use the NBR-REP-RSP message in addition to the CQICH to request mode conversion. In this case, the mobile station transmits the channel quality information for each band of the service base station and channel quality information for each band obtained through scanning of the neighboring base station to the service base station together with the NBR-REP-RSP message (S107). An example of the NBR-REP-RSP message is as follows.

TABLE 5

| REP-REQ Channel Type request | Name | Type | Length | Value |
|---|---|---|---|---|
| Channel Type = | Normal sub-channel report | 2.1 | 1 | First 5 bits for the CINR measurement report and the rest for don't care 5 LSBs CINR measurement report. The rest of the bits are reserved(set to zero) |
| Channel Type = | Band AMC Report | 2.2 | 4 | First 12 bits for the band indication bitmap and next 25 bits for CINR reports(5 bits per each band) |
| Channel Type = | Safety Channel Report | 2.3 | 5 | The first 20 bits for the reported bin indices and the next 20 bits for CINR reports(5 bits for each bin) |
| Channel Type = 001(case I): includes MS requesting band sharing type | Band Sharing Report: Normal subchannel -> band sharing | 2.4 | 5 or 9-5x(Number of Neighbor MS) | First 8 bits for the neighbor BS indication bit map, next 12-12x(Number of Neighbor BS) bits for the band indication bitmap and Next 25-25x(Number of neighbor BS) bits for CINR reports(5 bits per each band) |
| ... | ... | ... | ... | ... |

TABLE 5-continued

| REP-REQ Channel Type request | Name | Type | Length | Value |
|---|---|---|---|---|
| Channel Type = 100(case II) BS changes band sharing type referring to result which is transmitted by the MS | Band Sharing Report | 2.4 | 5 or 9-5x(Number of Neighbor MS) | First 8 bits for the neighbor BS indication bit map, next 12-12x(Number of Neighbor BS) bits for the band indication bitmap and Next 25-25x(Number of neighbor BS) bits for CINR reports(5 bits per each band) |

In Table 5, channel types 001~011 (channel type=001~011, case I) represent acknowledgement of the service base station in response to the case where the mobile station requests conversion to a specific mode through the CQICH, and channel type 100 (channel type=100, case II) represents setup of the mobile station to request conversion to a specific mode while the mobile station transmits the channel quality information to the base station in response to the case where the service base station requests channel quality information of the neighboring base station through the NBR-REP-REQ message.

In case II, the mobile station may select four to five best bands among bands of the service base station and bands of the neighboring base station to transmit channel quality information of the corresponding bands to the service base station. Alternatively, the mobile station may select four to five best bands for each base station to transmit channel quality information of the corresponding bands to the service base station.

The service base station provides each neighboring base station with the channel quality information transmitted from the mobile station through the band AMC-REQ message so that the mobile station selects four to five best bands (S109), and transmits the band AMC-IND message to each neighboring base station to finally identify the base station which will perform the band sharing AMC mode (S111).

Subsequently, if each neighboring base station allocates downlink resources for data transmission to the mobile station and transmits downlink zone information to the service base station through DL-MAP, the service base station reports the downlink zone information to the mobile station (S113).

Afterwards, the service base station allocates new CQICH by transmitting CQI Alloc IE to the mobile station (S115), and the mobile station transmits channel quality information of the neighboring base station to the service base station through the allocated CQICH by periodically identifying the channel quality information of the neighboring base station (S117). In this case, a difference value (for example, increase and decrease value or information as to increase or decrease) from initial transmission information is preferably transmitted as the channel quality information. Also, step S117 can be performed using the CQICH allocated in step S103.

Afterwards, the mobile station still can identify the channel status for each band of the neighboring base station through scanning with the neighboring base station (S119). If the channel status value of some band of the neighboring base station is greater than an average channel status value of each band of the band AMC mode which is currently in service, the mobile station can request the service base station of mode conversion through the steps performed after the step S103. For example, it is assumed that CINR and RSSI are used as the channel status value. In this case, if the current CINR is less than a reference value but RSSI is high, the mobile station can request the service base station of scanning for identifying channel quality information for each band of neighboring cells or can request conversion to a specific mode.

Meanwhile, the above steps for sharing band resources between the respective neighboring base stations and managing them can be performed through separate equipment, i.e., a band resource controller, in addition to the service base station.

Hereinafter, a configuration of the mobile station which supports the band AMC method using resource sharing with the neighboring base station according to the present invention will be described.

Figure 5:
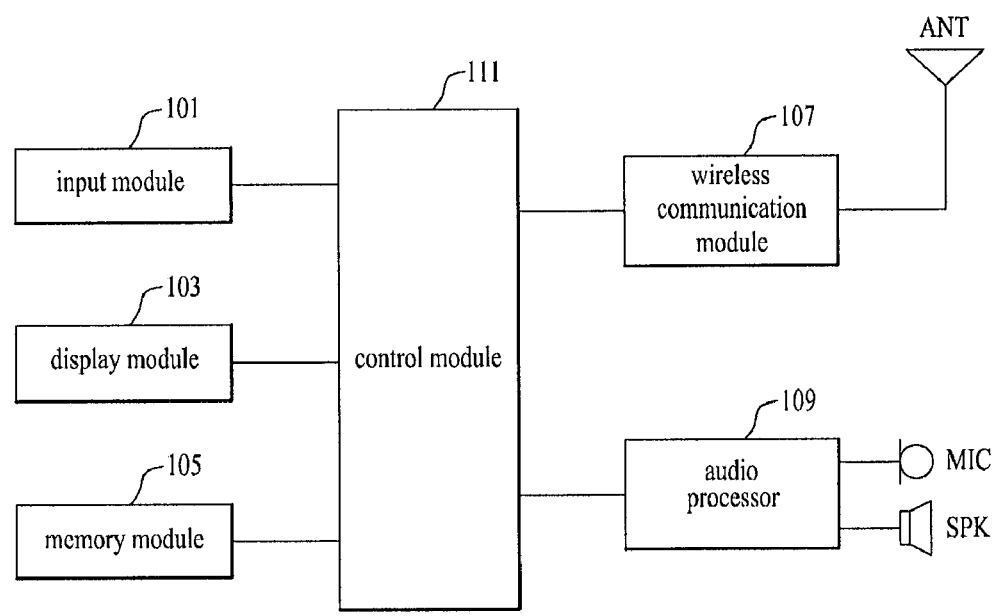
FIG. 5 is a block diagram illustrating a configuration of a mobile station according to the present invention.

FIG. 5 is a block diagram illustrating the configuration of the mobile station according to the present invention.

The mobile station includes an input module 101 selecting a desired function or inputting information, a display module 103 displaying various kinds of information for operating the mobile station, a memory module 105 storing various programs required to operate the mobile station and data to be transmitted to a receiving side, a wireless communication module 107 receiving an external signal and transmitting data to the receiving side, an audio processor 109 converting a digital audio signal into an analog audio signal, amplifying the converted audio signal, and outputting the amplified signal to a speaker (SP), or amplifying an audio signal from a mike (MIC) and converting the amplified signal into a digital signal, and a control module 111 controlling entire driving of the mobile station.

Particularly, the control module 111 identifies the channel status for each band by periodically scanning the neighboring base station, and requests the service base station of conversion to the band sharing AMC mode if the identified channel status satisfies a predetermined condition.

If the service base station requests the mobile station of the identified channel status, the request of mode conversion can be performed through a response message to the request of the service base station.

In addition, the detailed function for performing the band sharing AMC mode has been described in the aforementioned band sharing AMC method.

Meanwhile, examples of the mobile station according to the present invention include personal digital assistant (PDA), cellular phone, personal communication service (PCS) phone, global system for mobile (GSM) phone, wideband CDMA (WCDMA) phone, and mobile broadband system (MBS) phone.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

Industrial Applicability

The present invention can be applied to a broadband wireless access system. Particularly, the mobile station can select the best band by sharing the frequency band of the sub-channel for the band AMC mode with the neighboring base station. If the same data are received through the sharing channel, they are combined with each other, thereby enhancing reliability in transmission.

What is claimed is:

1. A band Adaptive Modulation and Coding (AMC) method performed by a mobile station in a broadband wireless access system, which shares resources with a neighboring base station neighboring a service base station, the band AMC method comprising:

identifying a channel status for each band of the neighboring base station by periodically scanning the neighboring base station;

receiving, by the mobile station, a Neighbor Report Request (NBR-REP-REQ) message for requesting that the mobile station report the identified channel status for each band of the neighboring base station;

selecting, by the mobile station, information corresponding to the identified channel status.

transmitting, by the mobile station, a Neighbor Report Response (NBR-REP-RSP) message for requesting a conversion to a band sharing AMC mode, wherein the NBR-REP-RSP message comprises the selected information corresponding to the identified channel status; and converting a current mode to the band sharing AMC mode if the identified channel status satisfies a predetermined condition, wherein the band sharing AMC mode is for sharing a predetermined number of best bands among bands of the service base station and bands of the neighboring base station.

2. The method according to claim 1, wherein converting the current mode to the band sharing AMC mode comprises:

requesting the conversion to the band sharing AMC mode if a maximum value of standard deviation of values of the identified channel status for each band is smaller than a band allocation threshold value.

3. The method according to claim 2, wherein the request is performed through a Channel Quality Information Channel (CQICH).

4. The method according to claim 3, wherein the request is performed using a predetermined plurality of bits of effective Carrier to Interference and Noise Ratio (CINR), enhanced fast-feedback channel subcarrier modulation, and band sharing fast-feedback channel subcarrier modulation.

5. A mobile station for supporting a band Adaptive Modulation and Coding (AMC) mode in a broadband wireless access system, the mobile station comprising:

a control module for identifying a channel status for each band of a neighboring base station neighboring a service base station by periodically scanning the neighboring base station, receiving a Neighbor Report Request (NBR-REP-REQ) message for requesting that the mobile station report the identified channel status for each band of the neighboring base station, selecting information corresponding to the identified channel status, transmitting a Neighbor Report Response (NBR-REP-RSP) message for requesting a conversion to a band sharing AMC mode, wherein the NBR-REP-RSP message comprises the selected information corresponding to the identified channel status, and converting a current mode to the band sharing AMC mode if the identified channel status satisfies a predetermined condition, wherein the band sharing AMC mode is for sharing a predetermined number of best bands among bands of the service base station and bands of the neighboring base station.

6. The mobile station of claim 5, wherein the control module is further for requesting the conversion to the band sharing AMC mode if a maximum value of standard deviation of values of the identified channel status for each band is smaller than a band allocation threshold value.

7. The mobile station of claim 6, wherein the control module is further for requesting the conversion to the band sharing AMC mode through a Channel Quality Information Channel (CQICH).

8. The mobile station of claim 7, wherein the control module is further for requesting the conversion to the band sharing AMC mode using a predetermined plurality of bits of effective Carrier to Interference and Noise Ratio (CINR), enhanced fast-feedback channel subcarrier modulation, and band sharing fast-feedback channel subcarrier modulation.

* * * * *